(12) United States Patent
Clark

(10) Patent No.: US 7,152,732 B2
(45) Date of Patent: Dec. 26, 2006

(54) PROTECTIVE HOUSING ASSEMBLY, AND ASSOCIATED METHOD, FOR OPTICAL STORAGE MEDIA

(75) Inventor: John M. Clark, Crowley, TX (US)

(73) Assignee: Radio Shack Corporation, Forth Worth, TX (US)

(*) Notice: Subject to any disclaimer, the term of this patent is extended or adjusted under 35 U.S.C. 154(b) by 372 days.

(21) Appl. No.: 10/621,939

(22) Filed: Jul. 17, 2003

(65) Prior Publication Data
US 2005/0011783 A1 Jan. 20, 2005

(51) Int. Cl.
*B65D 81/20* (2006.01)

(52) U.S. Cl. ............................ 206/308.1; 206/524.8

(58) Field of Classification Search ........... 206/307, 206/308.1, 309–312, 303, 524.8
See application file for complete search history.

(56) References Cited

U.S. PATENT DOCUMENTS

| 3,067,867 | A | * | 12/1962 | Bonham et al. ............ 206/223 |
| 5,111,938 | A | * | 5/1992 | Soprano et al. ............ 206/386 |
| 5,246,114 | A | * | 9/1993 | Underwood ............ 206/524.8 |
| 5,390,809 | A | * | 2/1995 | Lin ............................ 220/212 |
| 5,480,030 | A | * | 1/1996 | Sweeney et al. ......... 206/524.8 |
| 5,485,921 | A | * | 1/1996 | Tolendano .................. 206/545 |
| 5,791,075 | A | * | 8/1998 | Martell ............................ 40/1 |
| 6,499,574 | B1 | * | 12/2002 | Anthony ........................ 190/36 |
| 6,678,239 | B1 | * | 1/2004 | Clemens ...................... 720/736 |
| 2002/0074259 | A1 | * | 6/2002 | Gutierrez et al. ........... 206/545 |

* cited by examiner

*Primary Examiner*—Jila M. Mohandesi

(57) ABSTRACT

A protective housing assembly, and an associated method, for storing optical storage media, such as a compact disc or digital video disc. The housing assembly includes a housing base member and a housing cover member that are positionable in a confronting arrangement that defines an enclosure. When storage media is positioned at the area forming the enclosure, and the housing base and cover members are positioned in the confronting arrangement, an airtight enclosure is formed. Air is evacuated out of the enclosure by an evacuator to form vacuum conditions at the enclosure. Environmental elements that might degrade or damage the storage media are maintained thereby out of contact with the storage media.

18 Claims, 3 Drawing Sheets

PROTECTIVE HOUSING ASSEMBLY, AND ASSOCIATED METHOD, FOR OPTICAL STORAGE MEDIA

The present invention relates generally to a manner by which to protect optical storage media, such as a compact disc (CD) or digital video disc (DVD), from degradation or damage as a result of exposure to environmental conditions. More particularly, the present invention relates to a protective housing assembly, and an associated method, that protectively stores the optical media.

The media is placed at an enclosure formed by the housing assembly, and the enclosure is evacuated to a selected level of vacuum at the enclosure. The creation of the vacuum environment about the optical storage media reduces the exposure of the optical media to environmental conditions. When stored at the protective housing, the optical media is isolated from ambient environmental conditions that cause the degradation or damage to the optical media. By reducing the susceptibility of the optical media from degradation or damage, the integrity of the data stored on the media is better maintained. Media failure preventing the retrieval of the data is less likely as the media disc is less likely to sustain damage during its storage.

BACKGROUND OF THE INVENTION

Information and data processing is increasingly becoming an endemic part of aspects of modern society. And, with continued technological advancements, the pervasiveness of information technologies into yet further aspects of business and recreational activities shall likely occur.

Information technology, in large part, pertains to the accumulation, manipulation, storage, and retrieval of data. With the availability of digital processing devices and techniques, large amounts of data, once accumulated, can quickly be manipulated and processed. And, many different types of storage media have been developed, permitting the digital data to be stored, both on a transient basis and permanently. Electronic, magnetic, and optical storage media are all general categories of storage media that are used to store data. Data storage media of the different categories exhibit different characteristics and provide different advantages. Generally, electronic storage media provides for the quickest access of stored data while magnetic and optical storage media provides for bulk storage of large amounts of data at modest costs.

Standardization bodies have promulgated standardized formatting and storage schemes that have been widely adopted. Data storage, retrieval, and processing apparatus constructed to be incompliance with the promulgations of the standard setting bodies permit the data to be retrieved and manipulated by any device that operates in conformity with the standard.

Optical storage media, such as the aforementioned compact discs and digital video discs, are each capable of storing digital data that is later is retrievable. Compact discs and digital video discs upon which digital data forming music, video, multimedia, etc. data is commercially available, e.g., available for purchase with the digital data recorded thereon. A purchaser, using an appropriate data retrieval and display device, reads and plays the data, permitting viewing of the stored data. Some commercially available devices provide for the recording of the data on such compact discs or digital video discs.

The data recorded on these storage media and the dimensions of the storage media conform to standards promulgated by standard setting bodies, thereby to ensure that the data stored on the storage media can later be read by another device that operates in conformity with the standard.

Both compact discs and digital video discs are of substantially identical physical dimensions but have differing storage capacities. Such storage media are of generally circular, planar dimensions, having diametral dimensions of approximately 120 mm, thereby defining a substantially planar disc. Compact discs and digital video discs also generally are formed of a substrate and lamination layers formed upon both sides of the substrate. The data is printed, i.e., etched, upon one, or both, of the surfaces of the substrate.

While the lamination layers are intended to protect the surfaces of the substrate, moisture, or other material, collecting at the edge surface of the disc might seep between the layers of the disc, thereby damaging the disc and preventing the recorded data, recorded thereon, from being retrieved.

Additionally, material adhering to the surfaces of the disc, such as on the laminated coatings, might also limit, or prevent, the subsequent ability of a device to read the data stored at the disc.

Environmental conditions of the ambient atmosphere about the optical storage media might, at least in part, be the cause of degradation or damage to the optical media storage disc. While containers for supporting such optical media storage discs are available and commonly used, sometimes referred to as cassettes, their use does not isolate the media storage discs from ambient environmental conditions, such as degrading atmospheric elements. As a media storage disc is susceptible to damage or degradation from ambient environmental conditions contained in the atmosphere, if a manner could be provided by which better to isolate the media storage from such conditions, damage and degradation to the media storage would be less likely to occur.

It is in light of this background information related to the protection of storage media that the significant improvements of the present invention have evolved.

SUMMARY OF THE INVENTION

The present invention, accordingly, advantageously provides an assembly, and an associated method, by which to protect optical storage media, such as a compact disc (CD) or digital video disc (DVD) from degradation or damage as a result of exposure to environmental conditions.

Through operation of an embodiment of the present invention, a manner protectively to store optical media at a protective housing is provided. When the optical media is stored thereat, the optical media is isolated from ambient environmental conditions. The ambient environmental conditions include, or possibly include, degradating elements that cause degradation or damage to the optical media.

Because, through use, or operation, of an embodiment of the present invention, the optical storage media is less susceptible to degradation or damage, the integrity of the data stored on the media is better maintained. That is to say, media failure, which prevents the retrieval of the data, is less likely to occur as the media disc is less likely to sustain damage during its storage.

In one aspect of the present invention, a housing structure is provided by which supportively to engage a storage media disc. A housing is formed, including a housing base member and a housing cover member. The housing base and cover members are positionable to an enclosure. When the media storage disc is positioned at the area at which the enclosure is defined, and the housing base and cover members are positioned in an enclosed position defining the enclosure, the storage media disc is completely enclosed by the housing.

The housing base member includes a spindle at which a central through hole of the storage media disc is positioned to be supported in position thereby. Additional storage media discs are also positionable in like manner so that more than storage media disc is supported at the housing. Alternately, or further additionally, a spindle is formed at the housing cover member, also of dimensions permitting the central through hole of the storage media disc to be positioned thereabout, supportively to engage the storage media disc thereby. Additional storage media discs are also positionable in this implementation supportively to engage also the additional storage media discs.

When the housing base and cover members are positioned appropriately and placed in abutment with one another, the resultant housing forms the enclosure about the media storage disc or discs to isolate the storage media from the ambient environment beyond the enclosure. One, or the other, or both of the housing base and cover members includes a permitral flange portion that meets in abutting engagement with an opposing one of the housing members when positioned to form the enclosure. The housing member portions are constructed, at least at the perimetral portions that abut against one another of a material such that an airtight seal is formed between the housing member portions. Alternately, a separate gasket member positioned at the location of abutment provides the airtight seal therebetween.

The housing base and cover members are, in one implementation, wholly separable. In another implementation, the housing member portions are hingedly connected to one another and rotatably pivotal about the hinged connection. The housing cover member, in this implementation, is rotatable about the hinged connection to position the cover member to abut against the housing base member to form the airtight enclosure.

In another aspect of the present invention, an air evacuator, in fluid connectivity with the enclosure formed by the housing members, operates to evacuate the ambient air out of the enclosure to form a vacuum therein. A selected level of vacuum is provided through operation of the air evacuator. When the vacuum is created, ambient air, and the degradation elements potentially forming portions thereof are no longer contained at the enclosure. Degradation or damage to the storage media supported in the enclosure is thereby prevented. In one implementation, the air evacuator is affixed permanently in position at one of the housing member portions. In another implementation, the air evacuator is separable therefrom. A pump member is releasably connected to the housing by way of a fluid connector. Operation of the pump evacuates the air out of the enclosure, thereby to form the vacuum therein. An indicator, having sensors at the enclosure, provides indications of the level that is formed by operation of the air evacuator.

Because the vacuum is formed at the enclosure, and the storage media is supportively engaged thereat, ambient environmental conditions that might otherwise degrade or damage the storage media, making the storage media unreadable, is less likely to occur. Increased longevity of usefulness of storage media is, as a result, possible.

In these and other aspects, therefore, a protective housing assembly, and an associated method, is provided. Optical media is releasably stored therein. When stored therein, the optical media is maintained in isolation from ambient environmental conditions. The optical media is of first diametral dimensions. A housing base member is of dimensions at least corresponding to the first diamtral dimensions of the optical media. The housing base member supportively engages the optical media thereat. A housing cover member is positionable upon the housing base member. When positioned thereat, and when the optical media is engaged at the base housing member, the housing cover member and the housing base member together define an enclosure that encloses the optical media. An evacuator is at least engageable in fluid connectivity with the enclosure defined by the housing base member together with the housing cover member when positioned thereon. The evacuator evacuates air out of the enclosure to a selected level of vacuum. Thereby, the optical media is maintained in isolation from the ambient environmental conditions.

A more complete appreciation of the present invention and the scope thereof can be obtained from the accompanying drawings that are briefly summarized below, the following descriptions of the presently-preferred embodiments of the invention, and the appended claims.

DETAILED DESCRIPTION

Figure 1:
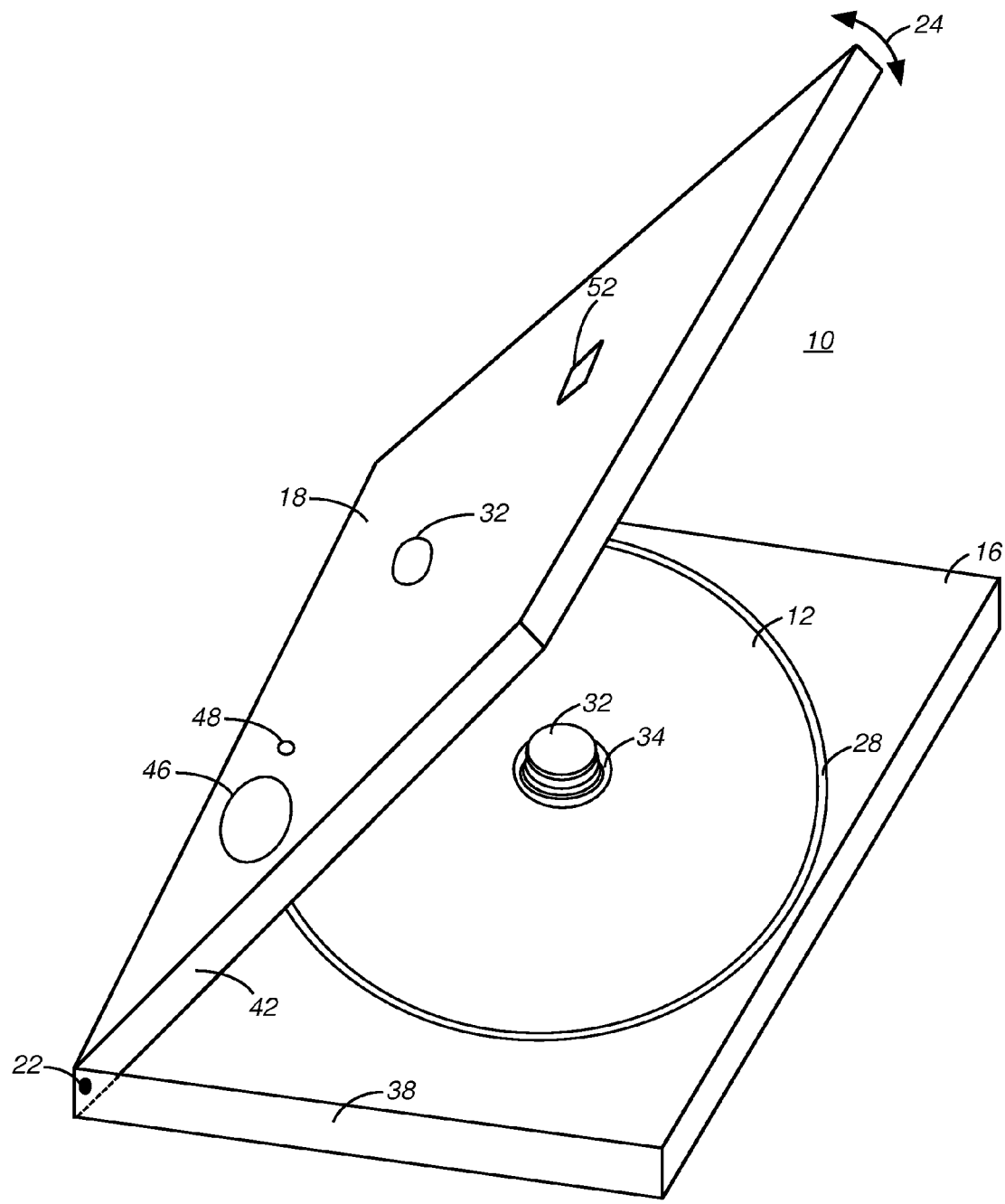
FIG. 1 illustrates a partial functional block, partial perspective view of the protective housing assembly of an embodiment of the present invention.

Referring first to FIG. 1, a protective housing assembly, shown generally at 10, of an embodiment of the present invention operates to supportively engage a media storage disc 12, such as a compact disc (CD) or digital video disc (DVD) in isolation from ambient environmental conditions of the environment at which the housing assembly is located. By maintaining the storage media in isolation from the ambient environmental conditions, degrading elements of the ambient environment do not contact with the storage media. Damage, or other degradation, to the storage media that might be caused by the degrading elements are prevented from occurring through storage of the storage media at the protective housing assembly pursuant to operation of an embodiment of the present invention. Damage that might render the data stored at the storage media unreadable as a result of ambient-atmosphere contaminants is less likely to occur through the storage of the storage media at the protective housing assembly.

In the exemplary implementation, the protective housing assembly includes a housing base member 16 and a housing cover member 18. The housing base and cover members 16 and 18 are hingedly connected theretogether by way of a hinged connector 22. Rotatable movement of the base and cover members, relative to one another, are permitted about the hinged connector. Here, the housing cover member is permitted relative rotation in the directions indicated by the arrow 24. In FIG. 1, the housing assembly is positioned in an open configuration. Relative rotation of the housing cover member in the clockwise direction of the arrow 24 configures the assembly in the closed position that defines an enclosure that isolates storage media, when positioned in the enclosure in isolation from the ambient environment about the housing assembly.

The base and cover members are constructed of a desired material, such as molded, thermoplastic materials formed during a molding process. The base and cover members are each of widthwise and lengthwise dimensions that are greater than the diametrical dimensions of the storage media such that the enclosure defined by the housing assembly and at which the storage media is supportively engaged. The storage media is, here, of diametrical dimensions of 120 mm.

In the exemplary implementation, an inner face surface 26 of the base member includes a recessed area 28 of dimensions substantially corresponding to, but greater than, the diametrical dimensions of the storage media. And, a spindle 32 is formed to extend above the inner face surface of the base housing member. The spindle member forms a truncated conical section. A central through hole 34 formed through the storage media 12 and a top portion of the spindle 32 are of diameters permitting the supportive engagement of the storage media at the recessed area 28 about the spindle 34. In one implementation, the spindle 34 is of a height permitting two or more storage media discs supportively to be engaged thereabout.

In a further implementation, a spindle 34 is alternately, or additionally formed at an inner face surface, hidden from view in the Figure, of the housing cover member 18. And, a recessed area, analgous to the recessed area 28 is also molded into the inner face surface. Multiple storage media discs also in this manner are supportively engageable at the spindle 32 formed at the housing cover member.

In the exemplary implementation, and as shown in the Figure, the housing base member includes perimetral flanges 38 extending about a perimeter of the housing base member. And, the housing cover member 18 also includes a perimetral flange extending about perimeters thereof. The heights of the respective flanges define the height of the enclosure when the respective housing member pieces are positioned to abut one another to form the enclosure. And, more particularly, the flanges are of relative heights and relative positions such that, when configured in the closed position, the flanges form an airtight seal about the periphery of the enclosure defined when the housing assembly is in the closed position.

The housing cover member 18 further includes an air evacuator 46. The air evacuator is affixed in position on the housing cover member 18 in the exemplary implementation shown in FIG. 1. The air evacuator here forms a diaphragm pump that is manually actuable to evacuate ambient air out of the enclosure formed by the housing assembly when in a closed position. An air egress including a one-way valve (hidden from view in the Figure) forms a channel for the exhaustion of the air out of the enclosure. A sensor 52 senses and indicates the level of vacuum created at the enclosure. The sensor comprises, for instance, a spring and wheel assembly, rotatable about an axis responsive to the creation of the vacuum at the enclosure.

Figure 2:
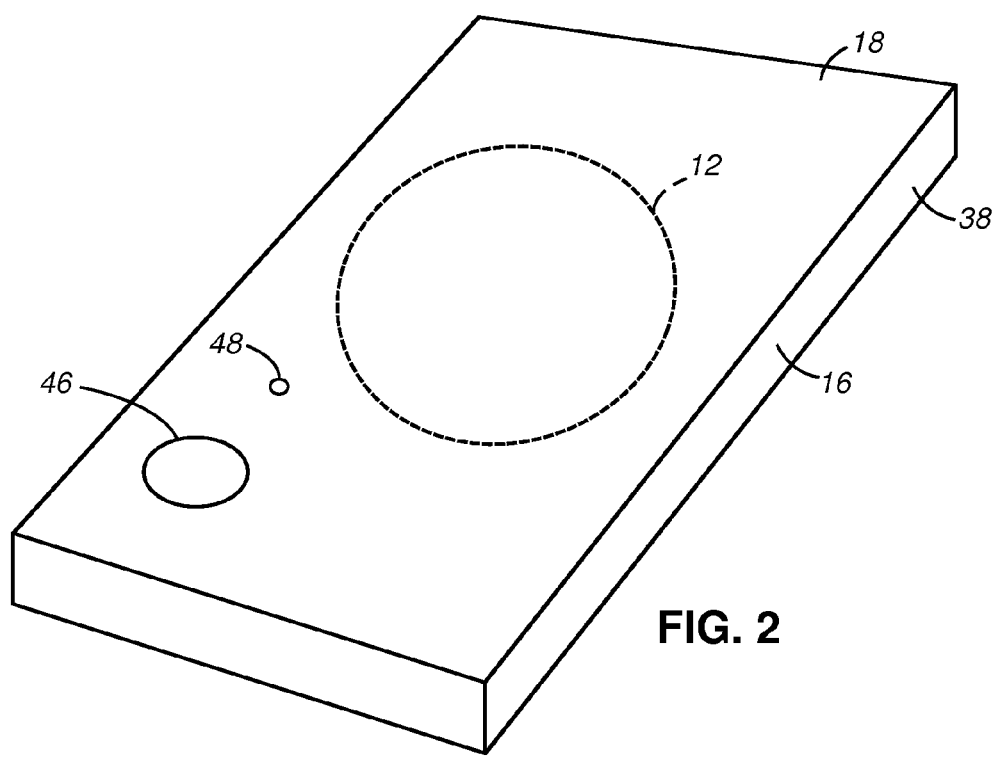
FIG. 2 illustrates a view, similar to that shown in FIG. 1, but here in which the protective housing assembly is positioned in a closed position in which a media storage disc is supportively engaged and isolated from ambient environmental conditions beyond the enclosure defined by the protective housing assembly.

FIG. 2 illustrates again the protective housing assembly 10. Here, the assembly is configured in the closed position in which one or more storage media discs are stored in supportive engagement. The housing cover member 18, when rotated about the hinged connector in the clockwise direction, is positioned in a confronting and abutting arrangement relative to the housing base member 16. An enclosure is defined by the enclosed area formed when the base and cover members are in the confronting arrangement. The outer flange 38 of the housing base member together with the flange portions 42 (hidden from view in FIG. 2) enclose the, and define the, sides of the enclosure. An airtight seal is formed to isolate the environment in the enclosure from the ambient environment about, i.e., outside of, the housing assembly. And, once the enclosed area of the enclosure is formed, manual actuation of the diaphragm pump forming the air evacuator evacuates the ambient air therefrom to create a desired level of vacuum. By formation of the vacuum at the enclosed area, degrading elements that might be contained in the ambient atmosphere are removed out of contact with the storage media. Degradation or damage to the storage media disc is therefore less likely to occur.

Figure 3:
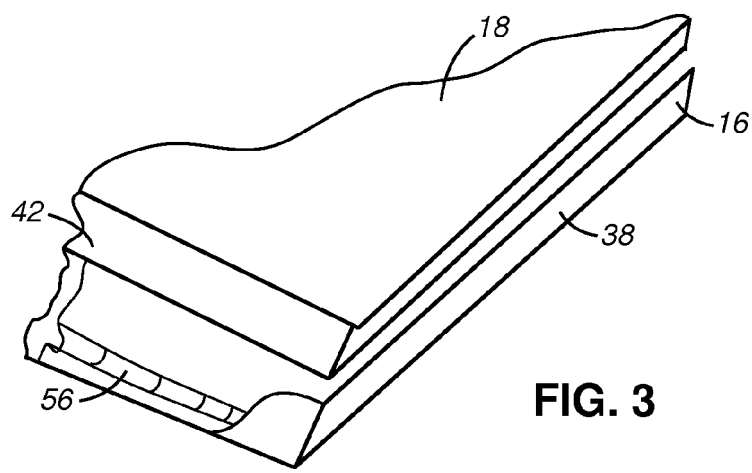
FIG. 3 illustrates an exploded, cut-away view of a portion of the protective housing assembly shown in FIGS. 1–2.

FIG. 3 illustrates portions of the housing base and cover members 16 and 18, here to show the manner by which an airtight seal is formed pursuant to an exemplary embodiment of the present invention when the housing cover member is positioned in the confronting arrangement with the housing base member. Here, a grooved indentation 56 extends along an inner face surface of the housing base member, and the flange portion of the housing cover member is of a height such that, when the base and cover members are positioned in the confronting arrangement, the lower edge portions of the flange 42 seat at, or extend into, the grooved portions 56. An airtight seal is created, completely isolating the enclosure from the ambient atmosphere. Subsequent operation to evacuate the air out of the enclosure creates the selected level of vacuum.

Figure 4:
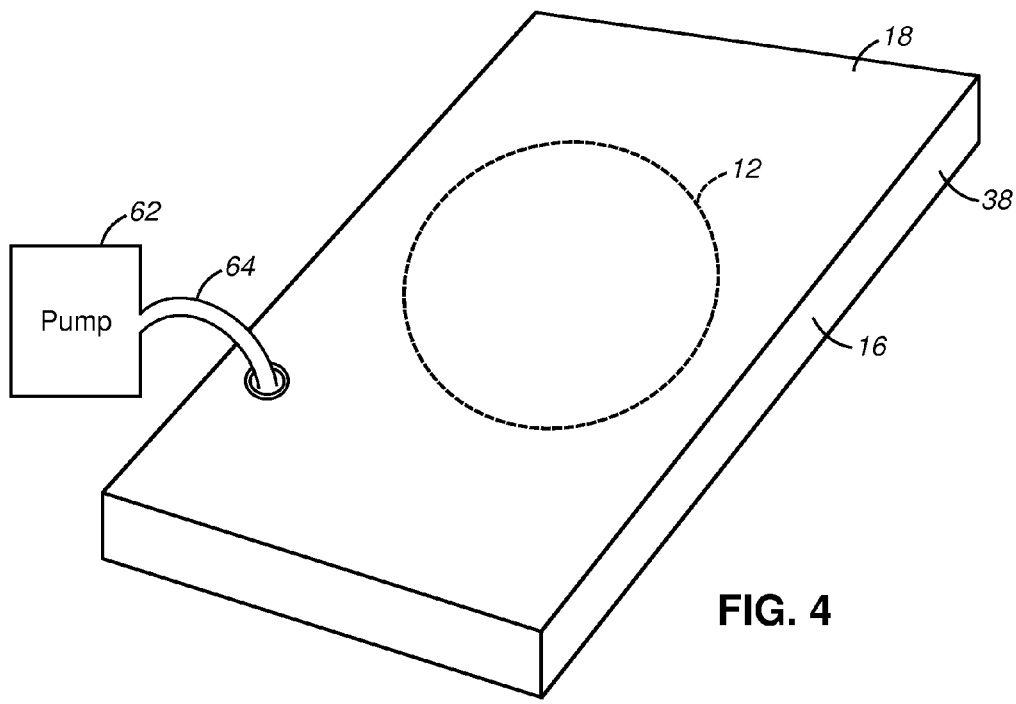
FIG. 4 illustrates a perspective view, similar to that shown in FIG. 2, but here of the protective housing assembly of another embodiment of the present invention.

FIG. 4 illustrates the protective housing assembly 10, here of another embodiment of the present invention. In this embodiment, the air evacuator is separably connected to the housing cover member, not permanently affixed thereto. The air evacuator here is formed a mechanical pump 62 and a fluid connector 64, coupled, at an end portion thereof, to a fixture positioned at the housing cover member and a channel formed therethrough to the enclosure. When air is to be evacuated out of the enclosure, the fluid connector is connected to the connector at the housing cover member and the pump 62 is actuated to evacuate the ambient air out of the enclosure and to form a vacuum thereat. Once the vacuum is formed, the fluid connector is taken out of engagement with the housing member.

Figure 5:
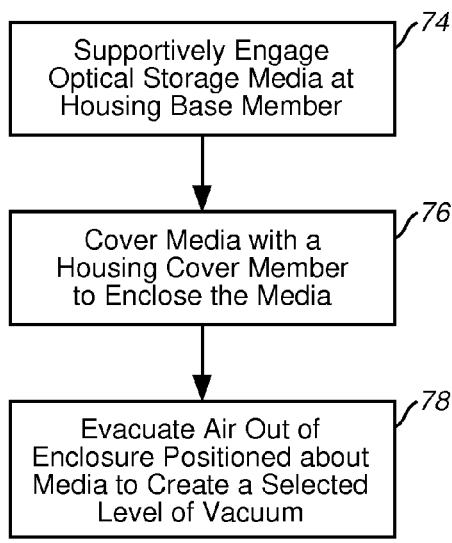
FIG. 5 illustrates a method flow diagram listing the method steps of the method of operation of an embodiment of the present invention.

FIG. 5 illustrates a method, shown generally at 72, of the method of operation of an embodiment of the present invention. The method releasably stores optical media in isolation from ambient environmental conditions. The optical media is of first diametrical dimensions.

First, and as indicated by the block 74, the optical media is supportively engaged at a housing base member. Then, the optical media is covered with a housing cover member such that, when covered, the housing base member and the housing cover member define an enclosure that encloses the optical media. And, as indicated by the block 78, air is evacuated out of the enclosure to form a selected level of vacuum, thereby to maintain the optical media in isolation from the ambient environmental conditions.

Thereby, when the air is evacuated out of the enclosure, degrading elements contained in the atmosphere do not interact with the storage media enclosed at the enclosure.

Damage that might occur to the storage media as a result of the interaction with the ambient environment does not occur.

The previous descriptions are of preferred examples for implementing the invention, and the scope of the invention should not necessarily be limited by this description. The scope of the present invention is defined by the following claims:

I claim:

1. A protective housing assembly for releasably storing optical media, when stored therein, the optical media maintained in isolation from ambient environmental conditions, the optical media of first diametrical dimensions, said protective housing assembly comprising:
   a housing base member of dimensions at least corresponding to the first diametrical dimensions of the optical media, said housing base member having a base-member spindle for supportively engaging the optical media in releasable engagement thereat;
   a housing cover member hingedly connected to said housing base member, such that, when the optical media is engaged at the base-member spindle, and said housing cover is rotated to be positioned upon said base housing member, said housing cover member and said housing base member together define an enclosure that encloses the optical media; and
   a pump at least engageable in fluid connectivity with the enclosure defined by said housing base member together with said housing cover member when positioned thereon, said pump for pumping air out of the enclosure to a selected level of vacuum, thereby to maintain the optical media in the isolation from the ambient environmental conditions.

2. The protective housing assembly of claim 1 wherein the optical media comprises at least a first optical media disc, and wherein said housing base member comprises a base member inner face surface at which the first optical media disc is positionable in supportive engagement thereat.

3. The protective housing assembly of claim 2 wherein the first optical media disc comprises a centrally-positioned through hole of a selected radial dimension extending therethrough, and wherein the base-member spindle is of radial dimensions substantially corresponding to the selected radial dimension of the through hole, permitting seating of the first optical disc member thereabout supportively in the releasable engagement.

4. The supportive housing assembly of claim 3 wherein the optical media comprises the first optical media disc and at least a second optical media disc, the second optical media disc also comprising a centrally-positioned through hole of the selected radial dimension, the second optical media disc also permitting of seating about the base-member spindle in the supportive engagement.

5. The protective housing assembly of claim 2 wherein the at least the first optical media disc comprises the first optical media disc and at least a second optical media disc, and wherein said housing cover member comprises a cover-member inner face surface at which the second optical media disc is positionable in supportive engagement thereat.

6. The protective housing assembly of claim 5 wherein the second optical media disc comprises a centrally-positioned through-hole of the selected radial dimension extending therethrough, and wherein said housing cover member comprises a cover-member spindle of radial dimensions substantially corresponding to the selected radial dimension of the through hole, permitting seating of the second optical disc member thereabout in the supportive engagement.

7. The protective housing assembly of claim 1 wherein at least a selected one of said housing base member and said housing cover member further comprises a perimetral flange member, said permetral flange member for abutting against an other of said housing base member and said housing cover member when said housing base member and said housing cover member are positioned to define the enclosure.

8. The protective housing assembly of claim 7 wherein the abutting of said perimetral flange member against the other of said housing base member and said housing cover member forms an airtight seal.

9. The protective housing assembly of claim 8 further comprising a gasket formed at the abutting of said perimetral flange and the other of said housing base member and said housing cover member.

10. The protective housing assembly of claim 9 wherein the gasket is integral to at least a selected one of said perimetral flange member and the other of said housing base member and said housing cover member.

11. The protective housing assembly of claim 1 wherein said pump is manually actuable to pump the air out of the enclosure.

12. The protective housing assembly of claim 1 wherein said pump is affixed, in permanent affixation, to a selected one of said housing base member and said housing cover member.

13. The protective housing assembly of claim 1 wherein said pump is separable from said housing base and said housing cover members, respectively.

14. The protective housing assembly of claim 13 further comprising a hose, the hose releasably connecting the pump with the enclosure defined by said housing base member together with said housing cover member.

15. A method for releasably storing optical media in isolation from ambient environmental conditions, the optical media of first diametrical dimensions, said method comprising:
   supportively engaging the optical media at a housing base member;
   covering the optical media with a housing cover member such that, when covered, the housing base member and the housing cover member define an enclosure that encloses the optical media; and
   pumping air out of the enclosure to form a selected level of vacuum, thereby to maintain the optical media in the isolation from the ambient environmental conditions.

16. The method of claim 15 further comprising the subsequent operations of removing the cover, thereby returning the optical media out of the isolation from the environmental conditions, and releasing the optical media out of supportive engagement with the housing base member.

17. The method of claim 16 further comprising the operation of connecting a pump in fluid connectivity with the enclosure and whrein said operation of pumping comprises operating the pump.

18. The method of claim 17 wherein said operation of pumping comprises manually pumping the air out of the enclosure.

* * * * *